Jan. 16, 1940.          J. B. BEACH          2,187,442
DENTAL FLOSS HOLDER
Filed April 28, 1938          3 Sheets-Sheet 1
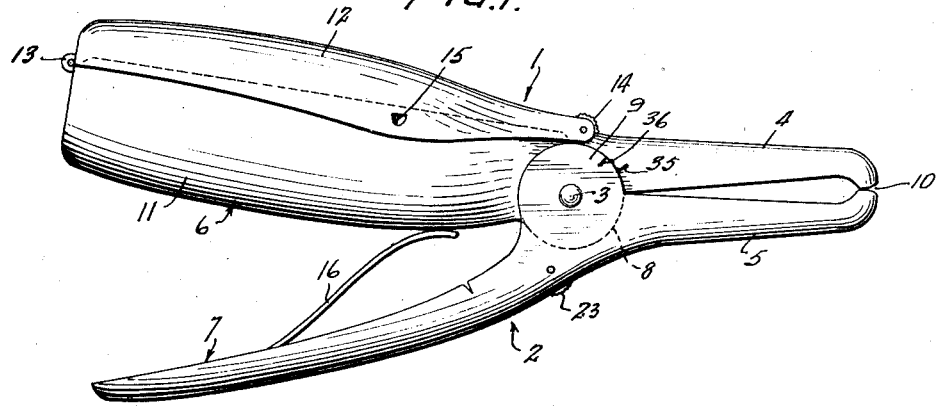
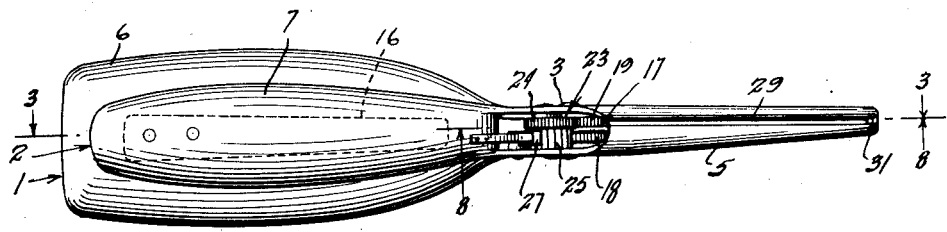
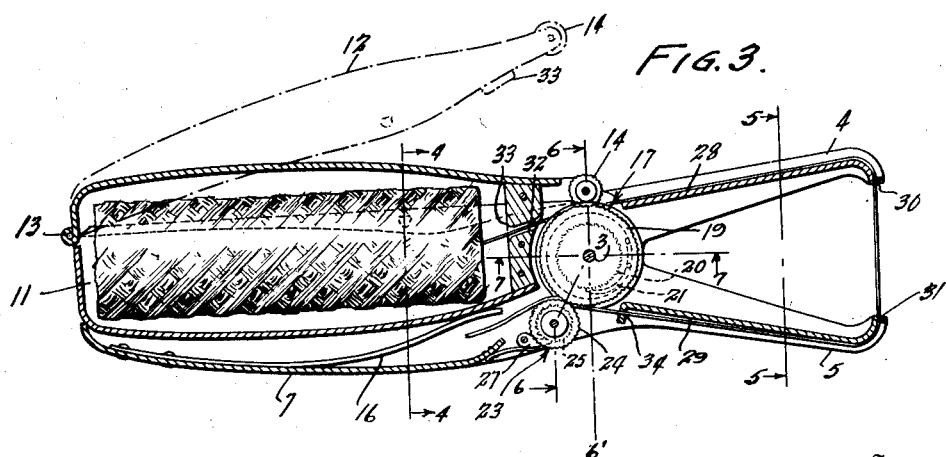
Inventor
JOHN B. BEACH
By Semmes, Keegin & Semmes
Attorneys Jan. 16, 1940.            J. B. BEACH                2,187,442
                     DENTAL FLOSS HOLDER
               Filed April 28, 1939        3 Sheets-Sheet 2
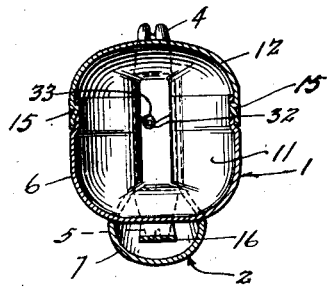
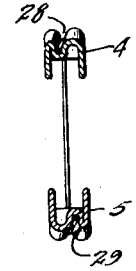
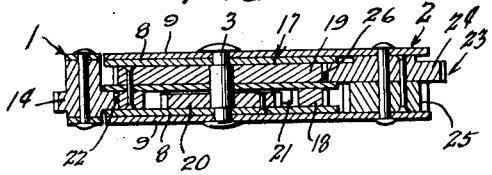
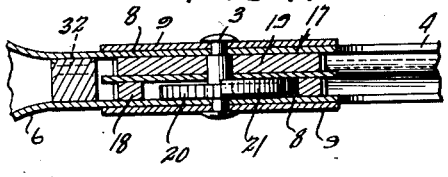
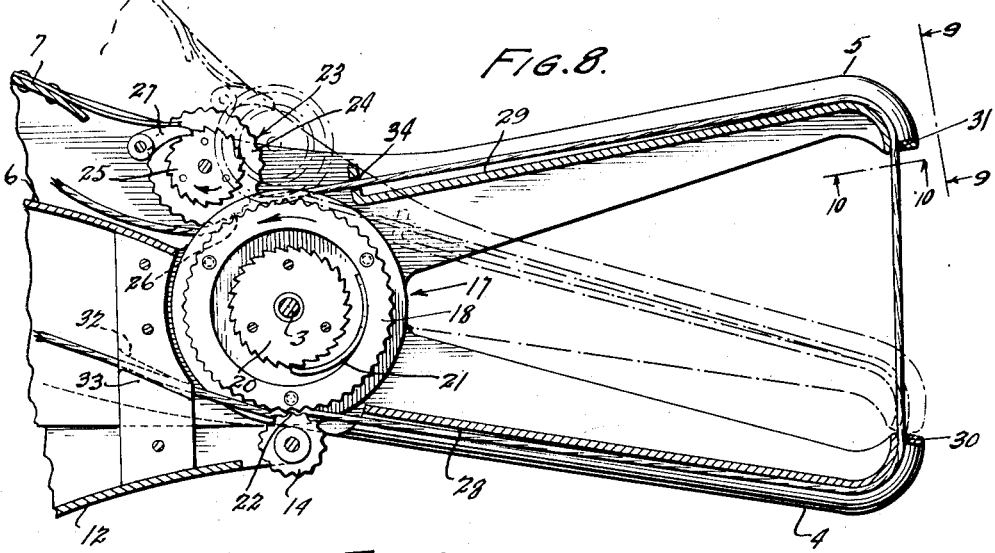
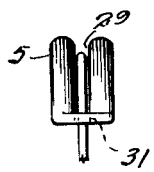
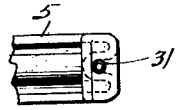
Inventor
JOHN B. BEACH
By Semmes, Keegin & Semmes
              Attorneys Jan. 16, 1940.                J. B. BEACH                2,187,442
                           DENTAL FLOSS HOLDER
                         Filed April 28, 1938           3 Sheets-Sheet 3
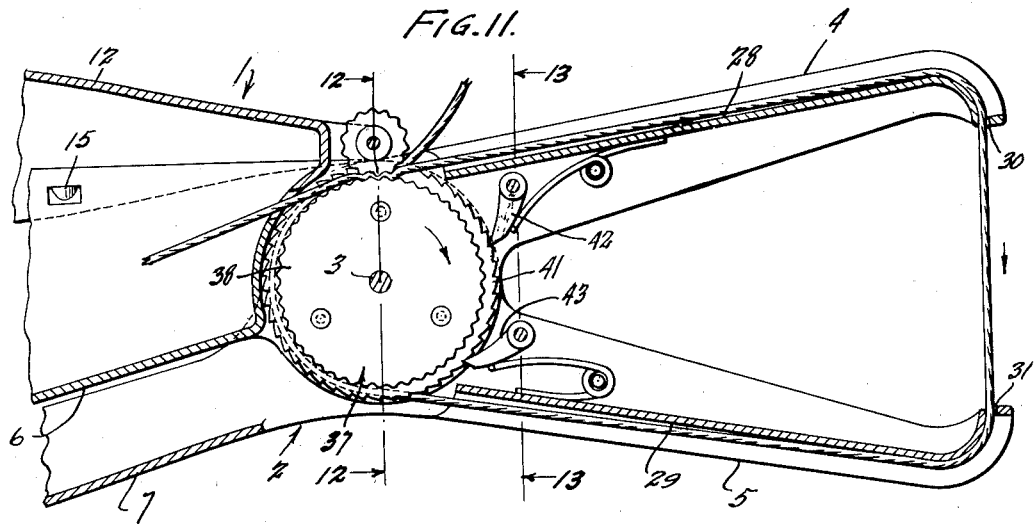
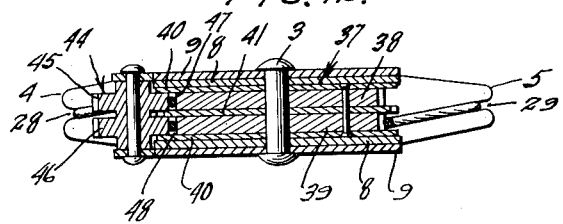
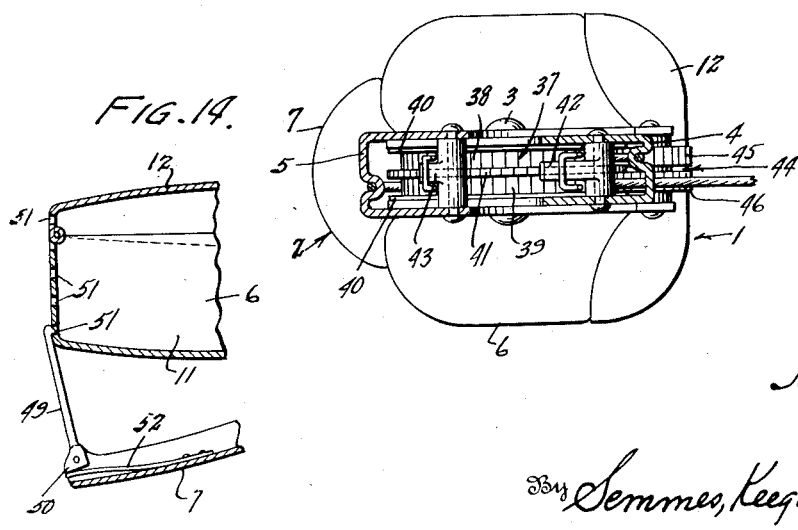
Inventor
JOHN B. BEACH
By Semmes, Keegin & Semmes
Attorneys Patented Jan. 16, 1940

2,187,442

UNITED STATES PATENT OFFICE 2,187,442

DENTAL FLOSS HOLDER

John B. Beach, Washington, D. C.

Application April 28, 1938, Serial No. 204,863

27 Claims. (Cl. 132—92)

This invention is an improved device for holding and stretching a length of dental floss so that it can be conveniently inserted between the teeth for cleaning purposes, and which automatically holds and stretches the floss, and feeds it through the holding and stretching members of the device.

Heretofore, holders have been designed which fail to maintain the floss in a sufficiently taut state to permit it to be used efficiently to clean between the teeth. This is usually due to the fact that while the holders provide for stretching the floss into a taut state before it is applied between the teeth, they fail to provide adequate means for taking up the slack, caused by using the floss, while the floss is being used between the teeth.

Moreover, the devices heretofore designed are often of a cumbersome shape, making it inconvenient or dangerous to use them in the oral cavity. For instance, many of the devices provide fastening mechanisms which protrude from the instrument in such a way that they might injure the gums, teeth, or lining of the mouth.

Other disadvantages might be suggested, such as the inconvenience caused by threading the device, fastening and stretching the length of floss to be used, and the lack of any mechanism for automatically replacing a length of used floss with a new and unused length. Moreover, many of the devices do not provide a mechanism which will permit the use of dental floss put up in skeins or cylindrical rolls, which is the form in which it is customarily placed upon the market, but require the floss to be wound first upon special bobbins or spools, which are an essential element of the fastening and stretching mechanism. In other words, many of the devices fail to provide a mechanism for fastening and stretching merely a length or loop of floss of sufficient size to be used between the teeth, but call for the fastening of the extreme end of the wound portion of the floss by means of a bobbin, spool, or the like, upon which the floss must first be firmly wound before it can be tightened or stretched by means of the mechanism provided in the holder.

One of the objects of my invention is to overcome the disadvantages now inherent in the prior art.

Another object of my invention is to provide a handy device, so designed that it can be used without danger of injuring the gums, the enamel of the teeth, or the lining of the mouth, and which is provided with a chamber or container in one of its handles, in which a skein of dental floss may be stored, from which a portion is automatically withdrawn as needed, without the necessity of removing it from the container in which it is purchased, and provided with two mechanical fingers for holding a length of the floss in a stretched and taut state in a convenient manner for use in cleaning the interstices of the teeth, and a simple mechanism for replacing a portion of the used length of floss with an equal amount of new and unused floss from the storage chamber, without the necessity of the operator's touching the floss, making any adjustments, or changing the position of the instrument in his hand, or removing the instrument from his mouth, and all by the simple action of opening and closing his hand in which the instrument is held.

Still another object of my invention is to provide a simple holder for dental floss which is so constructed that the floss can be threaded speedily and easily through the holding and stretching fingers and the fastening and feeding mechanism; and which, when once threaded, need not be rethreaded or adjusted, and the floss need not be handled by the operator or removed from its container so long as a supply of floss remains in the storage chamber.

Still another object of my invention is to provide a dental floss holder which will automatically feed the floss, without interruption, through the holding and stretching fingers of the device, and in such a manner that the used floss does not come in contact with the unused floss, so that it cannot be soiled or contaminated by it, and so that no part of the mechanism which touches the used floss will come in contact with the unused floss.

In the drawings:

Figure 1 is a plan view of one form of my invention showing the device at rest and without dental floss threaded through it.

Figure 2 is a side elevational view of the device shown in Figure 1.

Figure 3 is a cross-sectional view taken along line 3—3 of Figure 2 looking in the direction of the arrows.

Figure 4 is a view taken along line 4—4 of Figure 3 looking in the direction of the arrows.

Figure 5 is a view taken along line 5—5 of Figure 3 looking in the direction of the arrows.

Figure 6 is a view taken along line 6—6 of Figure 3 looking in the direction of the arrows.

Figure 7 is a view taken along line 7—7 of Figure 3 looking in the direction of the arrows.

Figure 8 is a view taken along line 8—8 of Figure 2 looking in the direction of the arrows.

Figure 9 is a fragmental end view of the device shown in Figure 8 taken along line 9—9 and looking in the direction of the arrows.

Figure 10 is a fragmental end view taken along line 10—10 of Figure 8 looking in the direction of the arrows.

Figure 11 is a fragmental, longitudinal, sectional view of a modified form of the device shown in Figure 1.

Figure 12 is a sectional view taken along line 12—12 of Figure 11 looking in the direction of the arrows.

Figure 13 is a sectional view of the device shown in Figure 11 taken along line 13—13 looking in the direction of the arrows.

Figure 14 is a fragmental, sectional view of a handle positioning device which may be used on either form of my invention.

As best shown in Figures 1 through 10, in one form of my device the frame of the device consists primarily of two members, designated generally as 1 and 2, which are pivoted together by a pin or rivet 3. The members 1 and 2 consist of mechanical fingers or prongs 4 and 5, handles or arms 6 and 7, and two semi-circular flanges 8 and 9, respectively. The members 1 and 2 are so constructed and pivoted together that when the ends of the two mechanical fingers 4 and 5 touch each other, as shown at 10, the two handles 6 and 7 are spread apart, in the manner shown in Figure 1, and the two fingers 4 and 5 are pulled apart when the handles 6 and 7 are drawn together, as shown in Figure 3.

The handle 6 of the member 1 comprises a hollow chamber or container 11 and a cover or lid 12 therefor, which is hinged at one end to the end of the container 11, as shown at 13, in such a way that the cover 12, when closed over the container 11, as shown in Figure 1, together with the container 11 constitute a completely closed chamber of a cylindrical shape. The other end of the cover 12 is so constructed as to form two bearings for the axle of the serrated roller 14.

The cover 12 is also provided with a latch or snap 15, which holds the cover 12 securely to the container 11 when the cover 12 is closed.

As shown in Figure 1, when the cover 12 is firmly closed on the container 11, the outer profiles of the two members 1 and 2 are substantially alike, except that one is the reverse of the other. Attention is called to this feature because the symmetrical shape of the two members 1 and 2, facilitates the use of the device in either the right or left hand of the operator.

Attached to the inner side of the handle 7 of the member 2 is a spring 16 which presses against the inner side of the handle 6 of the member 1, in such a manner that the handles 6 and 7 are normally forced apart, as shown in Figure 1. As previously mentioned, this causes the fingers 4 and 5 to come together until their extremities touch each other, as shown at 10 in Figure 1.

Using the pin 3 as an axle, a wheel, designated generally as 17, is mounted between the flanges 8 and 9 of the two members 1 and 2. This wheel is comprised of two serrated rollers 18 and 19, separated by a flange or rim, the edges of which extend beyond the teeth of the rollers 18 and 19. While, for the purpose of convenience, these component parts of the wheel 17 are shown as separate members of the wheel, held together by pins, it is obvious that the entire wheel 17 may be fabricated as one unit and of one piece of material.

A ratchet wheel 20 is positioned within the wheel 17 and is attached to the flange 8. A pawl 21 is attached to the inner part of the wheel 17 so that it engages with the notches of the rachet wheel 20 and prevents the wheel 17 from turning in a clockwise direction (viewed from the side shown in Figure 8).

When the cover 12 is firmly closed over the container 11, and locked to it by means of the latch or snap 15, the teeth of the serrated roller 14 mesh with the teeth of the serrated roller 18 of the wheel 17, as shown at 22.

A wheel 23, comprising a serrated roller 24 and a ratchet wheel 25, is mounted in a recess in the arm or handle 7 of the member 2, in such a position that the teeth of the roller 24 mesh with the teeth of the roller 19 of the wheel 17, as shown at 26. A pawl 27 is mounted on the arm 7 of the member 2 so that it engages with the notches of the ratchet wheel 25 of the wheel 23, and prevents the wheel 23 from turning in a counter-clockwise direction (viewed from the side shown in Figure 8).

The outer edges of the fingers 4 and 5 are provided with grooves 28 and 29, respectively, which run lengthwise of the fingers 4 and 5. The groove 28 is so placed in the finger 4 as to form a channel from the teeth of the roller 18 of the wheel 17 to the end of the finger 4 and ends in a hole 30, which provides a passageway for the dental floss from the end of the channel 28 through the end of the finger 4, in the direction of the finger 5. The groove 29 is so placed in the finger 5 as to form a channel from the teeth of the roller 19 of the wheel 17 to the end of the finger 5 and ends in a hole 31, which provides a passageway from the end of the channel 29 through the end of the finger 5 and toward the end of the hole 30 in the finger 4.

To load and thread the device with dental floss, the cover 12 is opened as shown by the dotted lines in the Figure 3, and a skein or roll of dental floss (in the container in which it was purchased or removed therefrom) is placed in the container 11. One end of the floss is then threaded along the groove 32 in the member 1, which together with the groove 33 in the cover 12 form a channel, thence over the teeth of the roller 18, along the groove 28, through the holes 30 and 31, along the groove 29, and through the eyelet 34 to the point of contact of the teeth of the rollers 19 and 24, which point of contact is shown at 26. With the end of the floss pressed against the meshed teeth of the rollers 19 and 24, it is threaded between them by turning the wheel 17 or the roller 24. The handles 6 and 7 are then brought toward each other until the mark 35 on the member 1 points to the mark 36 on the member 2. (The positions of the marks 35 and 36 must be predetermined, as explained below.) The floss is then pulled by hand over the teeth of the roller 18 and in the direction of the container 11. While the floss is in this position, the cover 12 is closed, so that the teeth of the roller 14 mesh with the teeth of the roller 18, so as to pin the floss between them, and the cover 12 is securely fastened to the container 11 by means of the latch 15. When the device has been threaded in the manner just described, it is ready for use.

It will be observed that a segment or loop of floss, running from between the point of contact of the teeth of the rollers 14 and 18, along the channel 28, through the holes 30 and 31, along the channel 29, through the eyelet 34, and between the meshed teeth of the rollers 19 and 24, has been segregated from the supply of floss and firmly confined by means of the sets of meshed serrated rollers, in the manner described.

In Figure 3, if we consider the line 7—7 as passing through the center of the pin 3, and remaining at all times midway between the fingers 4 and 5, whether they be at rest or moving, and that the line 6—6' also passes through the center of the pin 3, perpendicular to the line 7—7, then, so long as the rollers 14, 18, 19, and 24 remain meshed, as described above, the length of the loop of captive floss (measured from the points where the line 6—6' cuts the edges of the rollers 18 and 19) will always remain constant.

As pointed out above, it is important that the handles 6 and 7 should not be drawn completely together when the loop of floss is imprisoned in the manner described above, for room must be reserved for the handles 6 and 7 to be forced closer together in order to stretch the captive floss, by forcing the extremities of the fingers 4 and 5 further apart.

When the handles 6 and 7 are grasped in the hand and squeezed together, a length of floss is tightly stretched across the extremities of the fingers 4 and 5, and may be applied between the teeth for cleaning purposes. If the floss should have a tendency to slacken while being used, the device need not be withdrawn from the mouth but the handles 6 and 7 need only be forced closer together, thus exerting more of a pull on the extremities of the stretched length of floss.

When it is desired to replace a portion of the used length of floss with an equal amount of new and unused floss, the only action necessary is to release the grip on the handles 6 and 7, and allow them to be forced apart by the spring 16. As the handles move apart, two things occur simultaneously and automatically: (a) the fingers 4 and 5 approach each other until their extremities touch, as shown at 10 in Figure 1, or until the spreading motion of the handles 4 and 5 is stopped, thus relaxing the tension on the loop of captive floss, and (b) the center of the axle of the roller 24 is moved in a semi-circular path, resembling a segment of an orbit, around the roller 19, and its path describes an invisible arc with its center coinciding with the center of the pin 3. This circular movement of the axle of the roller 24 causes the teeth of the roller 24 to be pressed against the teeth of the roller 19, and, since the ratchet wheel 20 and the pawl 21 prevents the roller 19 from turning in a clockwise direction (viewed from the side shown in Figure 8), the roller 24 is forced to rotate in a clockwise direction (viewed from the side shown in Figure 8) and to revolve around the roller 19, with the teeth of the rollers 19 and 24 meshed at all times. In so doing, the teeth of the roller 24 roll over a segment of the loop of captive floss.

When the handles 6 and 7 are drawn together again, the pawl 27 engages with one of the notches in the ratchet wheel 25, and prevents the roller 24 from rotating in a counter-clockwise direction (viewed from the side shown in Figure 8). That being the case, the teeth of the roller 24 press against the teeth of the roller 19, and turn the roller 19 (and the entire wheel 17) in a counter-clockwise direction (viewed from the side shown in Figure 8), and, at the same time, the rotation of the roller 19 causes the roller 19 to turn the roller 14 in a clockwise direction. This action results in a segment of new floss, of the same length as the segment over which the teeth of the roller 24 rolled, being pulled from the skein of floss in the container, through the meshed teeth of the rollers 14 and 18, and displacing the segment of used floss, in the loop of captive floss, over which the teeth of the roller 24 rolled, and the length of the loop of captive floss (measured in the manner described above) remains unchanged. Since the length of the loop of captive floss remains the same as it was when the device was first threaded and the teeth of the roller 14 were meshed with the teeth of the roller 18, the length of floss across the extremities of the fingers 4 and 5 may again be stretched, as before, by squeezing the handles 6 and 7 closer together and forcing the fingers 4 and 5 further apart.

Until the supply of floss has been exhausted, the operation described above may be repeated as often as it is desired to replace used floss with unused floss, without the necessity of any readjustment of the floss or the device. Moreover, when the loop of captive floss is slack, used floss may be displaced with new floss by merely pulling the end of the used floss, which extends from the meshed teeth of the rollers 19 and 24, with the fingers. This is possible because of the manner in which the teeth of the rollers 14, 18, 19 and 24 mesh, and because of the location of the ratchet wheels 20 and 25 and the pawls 21 and 27. While it is true that floss may be pulled through the device in this manner, when the loop of captive floss is slack, this does not in any way hinder the stretching of the length of floss between the ends of the fingers 4 and 5. The stretching process is accomplished in a manner similar to the way a band of string may be stretched if looped over the index fingers of the hands and the fingers pulled apart. The length of the floss in the loop of captive floss remains constant, whether or not the floss is being pulled through the device, and in this respect it is analagous to the band of string, which may be rotated on the index fingers of the hand, as a belt, without lessening the tension (except to relieve friction) exerted by the pull of the index fingers. Because of friction, however, it would be extremely difficult to pull the floss through the device while the loop of captive floss is being stretched by the mechanical fingers 4 and 5. For this reason, the floss can be manipulated between the teeth for cleaning purposes, without the length stretched between the ends of the fingers 4 and 5 slipping.

In another form of my invention, as best shown in Figures 11 through 14, a wheel, generally designated as 37, is mounted between the flanges 8 and 9 of the two members 1 and 2, using the pin 3 as an axle. This wheel is comprised of two serrated rollers 38 and 39, which are provided with rims 40. The rollers 38 and 39 are separated by a rim or flange 41, which also serves as a ratchet wheel. A pawl 42 is mounted on the member 1 so that it engages with the notches in the ratchet wheel 41 and prevents the wheel 37 from revolving in a counter-clockwise direction (viewed from the side shown in Figure 11). A pawl 43 is mounted on the member 2 so that it engages with the notches in the ratchet wheel 41 and enables the handle 7 to act as a reciprocating lever for turning the ratchet wheel 41 (and with it the entire wheel 37) in a clockwise direction (viewed from the side shown in Figure 11).

A wheel 44, comprised of two serrated rollers 45 and 46, is mounted in the bearings of the cover 12.

When the cover 12 is firmly closed over the container 11, and locked to it by means of the latch or snap 15, the teeth of the roller 38 mesh with the teeth of the roller 45, as shown at 47, and the teeth of the roller 39 mesh with the teeth of the roller 46, as shown at 48.

This form of my device is loaded and threaded in the same manner as the form of my device described above, except that after the floss has been threaded through the groove 32 it is then laid over the teeth of the roller 38, along the groove 28, through the holes 30 and 31, thence along the groove 29 and over the teeth of the roller 39 and around the roller 39. With the floss in this position, the handles 6 and 7 are brought toward each other until the mark 35 points to the mark 36, and the slack in the loop of floss which has been threaded over the roller 38, through the stretching members of the device and around the roller 39 is taken up by pulling the loose end of the floss in the direction of the finger 4, and the portion of the floss coming from the skein, in the direction of the skein. While the floss is in this position the cover 12 is closed, so that the teeth of the roller 38 mesh with the teeth of the roller 45 and pin the floss which was pulled from the container and over the roller 38 between them, and the teeth of the roller 39 mesh with the teeth of the roller 46 and pin the floss which was pulled around the roller 39 between them.

The action for stretching the floss and feeding it through the stretching fingers is similar to that described in the first modification of my invention, but the mechanical operations of the device are of course different. As the handles 6 and 7 move apart, the pawl 43 clicks over the notches of the ratchet wheel 41, while the pawl 42 remains engaged in one of the notches of the ratchet wheel 41, and prevents the wheel 37 from revolving in a counter-clockwise direction (viewed from the side shown in Figure 11). When the handles 6 and 7 are drawn together again, the pawl 43 engages with one of the notches of the ratchet wheel 41, and the wheel 37 is turned in a clockwise direction. This causes a segment of the used floss to be withdrawn from the loop of captive floss, and released through the meshed teeth of the rollers 39 and 46; at the same time, an equal length of new floss is pulled from the container through the meshed teeth of the rollers 38 and 45, and, in the loop of captive floss, displaces the segment of used floss which is released. As in the first modification of my invention, this operation does not change the length of the loop of captive floss (measured from the point 47 to the point 48).

As previously mentioned, in threading either form of my invention it is essential that the handles 6 and 7 should not be drawn completely together when the loop of floss is imprisoned; room should be left to permit the handles 6 and 7 to be drawn closer together, after the floss is pinned between the serrated rollers, for the purpose of stretching the length of floss between the ends of the fingers 4 and 5; but, the handles 6 and 7 should not be too far apart, because, if they are, the fingers 4 and 5 will be too close together to permit the device to be used. The marks 35 and 36 are used to facilitate gauging the correct positions of the members 1 and 2 for this purpose. These marks must, of course, be placed in a position which will accomplish the desired result.

Another means for accomplishing the purpose served by the marks 35 and 36 is shown in Figure 14. This device consists of a hook 49, of a predetermined length, hinged to the inner side of the handle 7, as shown at 50. A row of holes 51 is provided in the end of the handle 7 into which the end of the hook 49 can be inserted. A spring 52 may be used to keep the hook 49, when not in use, snugly against the inner side of the handle 7, and when in use, to exert a force to cause the end of the hook 49 to remain in one of the holes 51. One of the holes 51 is so located that when the end of the hook 49 is inserted into it, the members 1 and 2 will be in the proper position for the loop of floss to be imprisoned. The end of the hook 49 may be inserted in other holes for the purpose of keeping the device in a compact position when not in use, and to maintain tension on the floss while in use, without the need of exerting manual pressure on the handles 6 and 7.

While for purposes of illustration I have discussed two modifications of my invention, it is obvious that many changes can be made therein without departing from the spirit of this invention. I, therefore, intend that this invention be only limited by the prior art and the scope of the appended claims.

I claim:

1. A device of the character described comprising mechanical means to maintain a length of dental floss in a taut condition, and other mechanical means to feed fresh floss to said first mentioned means.

2. In a dental floss holding device the combination of, a pair of pivoted members, a length of floss, an automatic feed mechanism for the floss, and means to operate the feed mechanism by movement of the said members.

3. In a dental floss holding device the combination of, a pair of pivoted members, a length of floss, an automatic feed mechanism for the floss associated with one of the members, and means to operate the feed mechanism by movement of the said members.

4. In a dental floss holding device, the combination of a pair of pivoted members, each member being constructed to form a handle at one extremity and a prong at the other, a length of floss, and an automatic feed mechanism for the floss actuated by the movement of the said pivoted members.

5. In a dental floss holding device, the combination of a pair of pivoted members, each member being constructed to form a handle at one extremity and a prong at the other, a length of floss situated within one of the handles, and an automatic feed mechanism for the floss actuated by the movement of the said pivoted members.

6. In a dental floss holding device, the combination of a pair of pivoted members, each member being constructed so as to form a handle at one extremity and a prong at the other, a length of floss situated within one of the handles, a feed mechanism comprising a plurality of serrated rollers associated with the handles, and means to operate the feed mechanism by movement of the pivoted members.

7. In a dental floss holding device, the combination of a pair of pivoted members, each member being constructed so as to form a handle at one extremity and a prong at the other, a length of floss situated within one of the handles, a feed mechanism comprising a wheel which consists of a pair of serrated rollers, a serrated roller on each of the said pivoted members by means of which the serrated rollers of the wheel are operated as a result of a pivoting movement of the pivoted members.

8. In a dental floss holding device, the combination of a pair of pivoted members, each member being constructed so as to form a handle at one extremity and a prong at the other, a length of floss situated within one of the handles, a feed mechanism comprising a wheel, one face of which is engaged by a serrated roller, said serrated roller being mounted on one of the said pivoted members.

9. In a dental floss holding device, the combination of a pair of pivoted members, each member being constructed so as to form a handle at one extremity and a prong at the other, a length of floss situated within one of the handles, a feed mechanism comprising a wheel comprising two serrated rollers, one of these serrated rollers being actuated by a third serrated roller mounted on one of the pivoted members when the said pivoted members are drawn closer together.

10. In a dental floss holding device, the combination of a pair of pivoted members, each member being constructed so as to form a handle at one extremity and a prong at the other, means to normally hold the handles apart, a length of floss situated within one of the handles, a mechanism for feeding the floss through the device, means to operate the said feed mechanism by movement of the pivoted members, and means to secure a tension on the dental floss by separating the said prongs.

11. In a dental floss holding device, the combination of a pair of pivoted members, each member being constructed so as to form a handle at one extremity and a prong containing a channel at the other, a length of floss situated within one of the handles, a feed mechanism comprising a wheel and a plurality of serrated rollers for feeding the floss through the said channels, and means to operate the feed mechanism by movement of the handles.

12. In a dental floss holding device, the combination of a pair of pivoted members, each member being constructed so as to form a handle at one extremity and a prong containing a channel at the other, a length of floss situated within one of the handles, a feed mechanism comprising a wheel which consists of a pair of serrated rollers, one of which is provided with a pawl, a serrated roller mounted on each of the said handles, one of said rollers being provided with a pawl, said last mentioned roller being capable of a circumferential movement when actuated by the reciprocating motion of the said pivoted members.

13. In a dental floss holding device, the combination of a pair of pivoted members, each member being constructed so as to form a handle at one extremity and a prong containing a channel at the other, a length of floss situated within one of the handles, a feed mechanism comprising a wheel which consists of a pair of serrated rollers, one of which is provided with a pawl, a serrated roller mounted on each of the said handles, one of said rollers being provided with a pawl, the said last mentioned roller being capable of a circumferential movement in respect to the serrated roller of the wheel which is provided with a pawl and with which it is meshed, said movement being actuated by a pivoting motion of the said pivoted members.

14. In a device of the character described, the combination of mechanical means for holding floss, mechanical means for stretching floss, and mechanical means for feeding fresh floss.

15. In a device of the character described, the combination of means for holding a length of floss, means for stretching said length, and automatic means for feeding fresh floss.

16. In a device of the character described, a mechanism for stretching dental floss comprising two pivoted members and a plurality of meshed serrated rollers.

17. In a device of the character described, a mechanism for stretching dental floss comprising two pivoted members, each member having a hole in its extremity for receiving the floss; and a plurality of meshed serrated rollers.

18. In a device of the character described, mechanism for feeding dental floss comprising two pivoted members; a plurality of serrated rollers; a ratched wheel integral with one of such rollers; and two pawls.

19. In a device of the character described, mechanism for feeding dental floss comprising two pivoted members; a plurality of serrated rollers; two ratchet wheels, each integral with one of such rollers; and two pawls.

20. In a device of the character described, a feed mechanism comprising two pivoted members; two serrated rollers, integral with a ratchet wheel, rotatably mounted on the pivot of the two members; a pawl attached to each pivoted member; two serrated rollers rotatably mounted on one of the pivoted members, so as to mesh with the two serrated rollers mounted on the pivot.

21. In a device of the character described, a feed mechanism comprising two pivoted members; two serrated rollers, integral with a ratchet wheel, rotatably mounted on the pivot of the two members; a pawl attached to each pivoted member; two serrated rollers rotatably mounted on the lid of the floss container, so as to mesh with the two serrated rollers mounted on the pivot when the lid is closed over the container.

22. In a device of the character described, a feed mechanism comprising two pivoted members; two serrated rollers, integral with a ratchet wheel, rotatably mounted on the pivot of the two members; a serrated roller rotatably mounted on one of the pivoted members so as to mesh with one of the serrated rollers mounted on the pivot, and a serrated roller integral with a ratchet wheel rotatably mounted on the other pivoted member so as to mesh with the other serrated roller mounted on the pivot; a pawl attached to each pivoted member.

23. In a device of the character described, a feed mechanism comprising two pivoted members; two serrated rollers, integral with a ratchet wheel, rotatably mounted on the pivot of the two members; a serrated roller rotatably mounted on the lid of the floss container, so as to mesh with one of the serrated rollers mounted on the pivot when the lid is closed over the container, and a serrated roller integral with a ratchet wheel rotatably mounted on the other pivoted member so as to mesh with the other serrated roller mounted on the pivot; a pawl attached to each pivoted member.

24. A device of the character described comprising, two members and a pivot at which they are connected, each having a handle and a prong extending in opposite directions from the pivotal connection, the handle and prong of each member being at the same side of a plane which contains the axis of the pivot and which extends between the two handles, whereby the approach of the handles separates the prongs; each prong having a hole in its extremity to receive floss; a spring to force the handles apart; a hook hinged to the end of one handle, the other handle having holes in the end of it into which the hook may be inserted to position the handles; a floss container in one of the handles, a lid therefor, and a latch for holding the lid to the container; two serrated rollers, integral with a ratchet wheel, rotatably mounted on the pivot; a pawl attached to each member; two serrated rollers rotatably mounted on the lid so as to mesh with the two serrated rollers mounted on the pivot when the lid is closed over the container.

25. A device of the character described comprising, two members and a pivot at which they are connected, each having a handle and a prong extending in opposite directions from the pivotal connection, the handle and prong of each member being at the same side of a plane which contains the axis of the pivot and which extends between the two handles, whereby the approach of the handles separates the prongs; each prong having a hole in its extremity to receive floss; a spring to force the handles apart; a hook hinged to the end of one handle, the other handle having holes in the end of it into which the hook may be inserted to position the handles; a floss container in one of the handles, a lid therefor, and a latch for holding the lid to the container; two serrated rollers, integral with a ratchet wheel, rotatably mounted on the pivot; a pawl attached to each member; two serrated rollers rotatably mounted on one of the pivoted members, so as to mesh with the two serrated rollers mounted on the pivot.

26. A device of the character described comprising, two members and a pivot at which they are connected, each having a handle and a prong extending in opposite directions from the pivotal connection, the handle and prong of each member being at the same side of a plane which contains the axis of the pivot and which extends between the two handles, whereby the approach of the handles separates the prongs; each prong having a hole in its extremity to receive floss; a spring to force the handles apart; a hook hinged to the end of one handle, the other handle having holes in the end of it into which the hook may be inserted to position the handles; a floss container in one of the handles, a lid therefor, and a latch for holding the lid to the container; two serrated rollers, integral with a ratchet wheel, rotatably mounted on the pivot; a serrated roller rotatably mounted on the lid, so as to mesh with one of the serrated rollers mounted on the pivot when the lid is closed over the container, and a serrated roller integral with a ratchet wheel rotatably mounted on the other pivoted member so as to mesh with the other serrated roller mounted on the pivot; a pawl attached to each pivoted member.

27. A device of the character described comprising two members and a pivot at which they are connected, each having a handle and a prong extending in opposite directions from the pivotal connection, the handle and prong of each member being at the same side of a plane which contains the axis of the pivot and which extends between the two handles, whereby the approach of the handles separates the prongs; each prong having a hole in its extremity to receive floss; a spring to force the handles apart; a hook hinged to the end of one handle, the other handle having holes in the end of it into which the hook may be inserted to position the handles; a floss container in one of the handles, a lid therefor, and a latch for holding the lid to the container; two serrated rollers, integral with a ratchet wheel, rotatably mounted on the pivot; a serrated roller rotatably mounted on one of the pivoted members so as to mesh with one of the serrated rollers mounted on the pivot, and a serrated roller integral with a ratchet wheel rotatably mounted on the other pivoted member so as to mesh with the other serrated roller mounted on the pivot; a pawl attached to each pivoted member.

JOHN B. BEACH.